United States Patent [19]

Phares et al.

[11] Patent Number: 5,560,630

[45] Date of Patent: Oct. 1, 1996

[54] ROTATING MULTIPLE BALL TRAILER HITCH

[75] Inventors: Benny E. Phares; Ronald R. Marthaler, both of Underwood, Minn.

[73] Assignee: J.B.J. Mfg. Inc., Faribault, Minn.

[21] Appl. No.: 457,821

[22] Filed: Jun. 1, 1995

[51] Int. Cl.⁶ ..................................................... B60D 1/06
[52] U.S. Cl. ......................... 280/416.1; 280/504; 280/511
[58] Field of Search .............................. 280/415.1, 416.1, 280/416.3, 504, 511

[56] References Cited

U.S. PATENT DOCUMENTS

| | | | |
|---|---|---|---|
| 2,506,090 | 5/1950 | Lee | 280/502 |
| 2,911,233 | 11/1959 | Riddle | 280/416.1 |
| 4,456,279 | 6/1984 | Dirck | 280/415 |
| 4,807,900 | 2/1989 | Tate | 280/416.1 X |
| 5,106,114 | 4/1992 | Haupt | 280/416.1 |
| 5,322,313 | 6/1994 | Schroeder | 280/416.1 |

Primary Examiner—Eric D. Culbreth
Assistant Examiner—Victor E. Johnson

[57] ABSTRACT

A Rotating Multiple Ball Trailer Hitch for mounting to motor vehicles and more specifically to motor vehicles utilizing a receiver type hitch is disclosed. This hitch consists of a U bracket welded to a receiver type hitch insert tube. A rotating platform fits inside the inner surface of the U bracket and is held in place by pivot bolt. This platform is bolted in an off centered position within the U bracket. The platform is further supplied with alternate position lock pin holes on the rear of the platform and trailer ball mounting holes on the front sides of the platform as well as a standard hitch pin hole in the front center of the platform. The rotating platform is held in the U bracket by a pivot bolt and is then further pinned in position with a standard pin and clip. By use of the U bracket and the off center mounting arrangement the strength of the hitch is maximized while its size is minimized. The disclosed hitch may also be modified for mounting directly to the bumper of a vehicle.

9 Claims, 5 Drawing Sheets

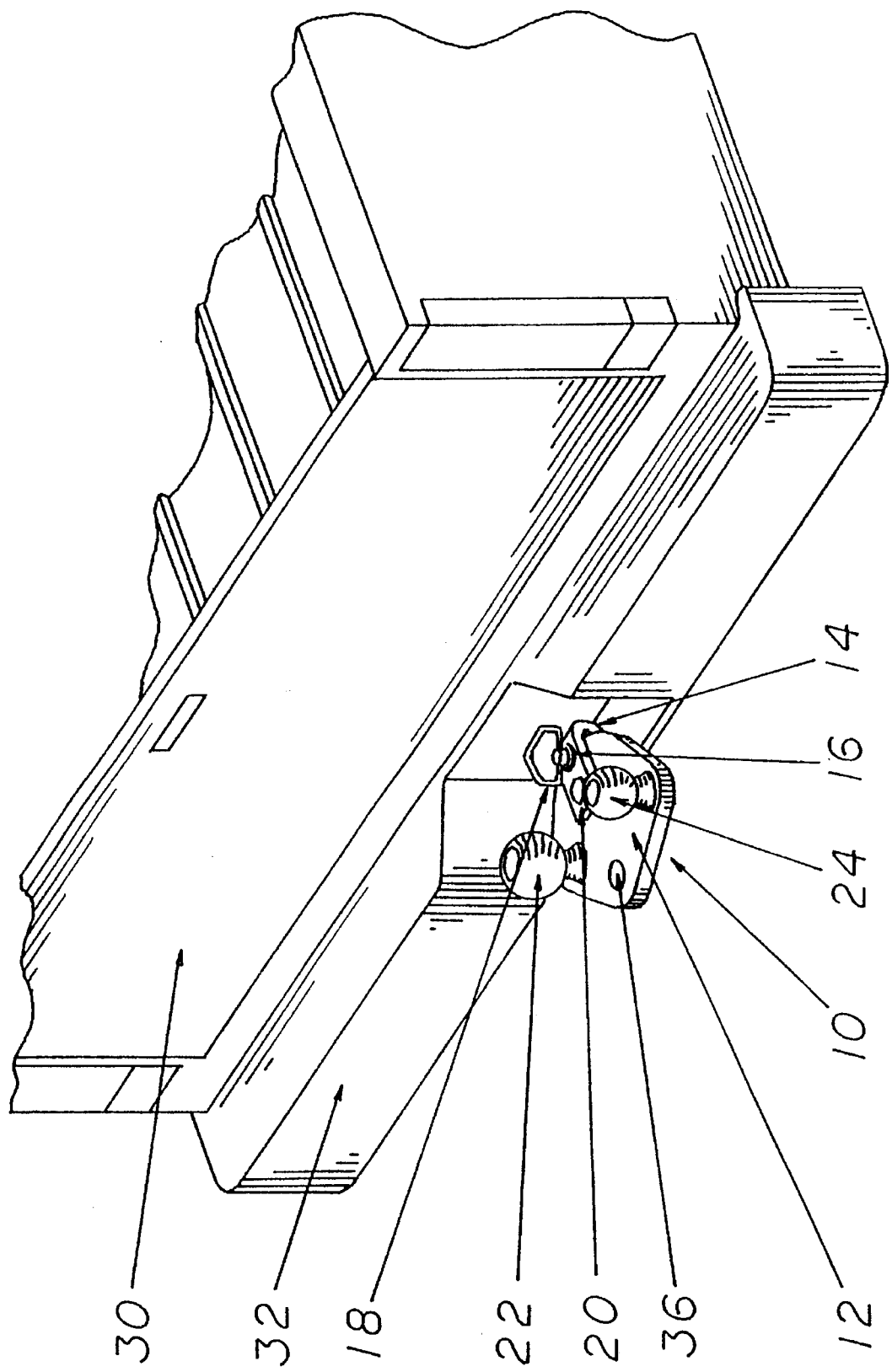

ROTATING MULTIPLE BALL TRAILER HITCH

BACKGROUND OF THE INVENTION

This invention relates to an improvement in multiple ball trailer hitches. More specifically, to a heavy use type rotating ball hitch specially designed to preform in conjunction with a receiver type hitch and further designed to use standard bolt on ball type connections.

With the large number of different hitch attachments on the market several attempts have been made at designing a hitch capable of attachment to different ball sizes and even pintle hooks. However, the disadvantages of many of these attempts has been well documented.

A Multiple Rear Bumper Hitch Apparatus is shown in U.S. Pat No. 5,106,114 to Haupt. It has been noted in Haupt that other hitch's in this field exist and have had difficulties, such as U.S. Pat No. 2,911,233 to Riddle and U.S. Pat No. 4,456,279 to Dirck. Haupt Notes that the disadvantages of Riddle have been found to be "many weak points in the construction, such as at the juncture between the upstanding sleeve and the brackets securing the device to a vehicle, and the relatively great loads or stresses placed on a hitch of this type causes a failure of the device at these weak points . . . " Haupt further notes that, "Likewise Dirck has disadvantages including its inability to accommodate more than two hitch balls at a time due to the small plate diameter." Haupt and Dirck also have an inherent disadvantages in that they use two plates on top on one another and thus when using ball type hitches the balls must be welded on to the top plate and can not be of the standard type bolt on ball connected with a nut on the bottom of the plate. This type of hitch further restricts the use of a standard pin type hitch connection. Haupt has solved the problem of more than two connections by making a bigger plate or platform for the various hitch attachments. However, a larger plate can be unsightly and cumbersome in certain applications as well as limiting the hitches usefulness when used in conjunction with today's popular heavy duty receiver type hitch. A still further problem with both Dirck and Haupt is that the plates are bolted through the center and thus when a large load is placed upon the hitch there is a tendency for the hitch to torque about the center bolt.

SUMMARY OF THE INVENTION

It is, therefore, an object of the present invention to provide a multiple hitch capable of having at least three different connection points of varying types. Second, it is an object of the present invention to provide a multiple hitch capable of accepting standard bolt on type balls of varying size as well as hitch's utilizing a standard type hitch pin. Third, it is an necessary that this hitch be mounted and rotated in such a way as to eliminate the torque about the center mount bolt so that the hitch may be rated Class II and III. Finally it is desirable that the hitch be minimized in size for not only aesthetic reason but to also reduce the weight of the hitch and make it applicable to receiver type hitches.

The preceding objects are accomplished by providing a Rotating Multiple Ball Hitch for mounting to motor vehicles and more specifically to motor vehicles utilizing a receiver type hitch. This is accomplished by attaching, preferably by weld, a U bracket unto a receiver type hitch insert tube. A rotating platform fits inside the inner surface of the U bracket and is held in place by a pivot bolt. This platform is bolted in an off centered position within the U bracket. The platform is further supplied with alternate position lock pin holes on the rear of the platform, trailer ball mounting holes on the front sides of the platform and a standard hitch pin hole in the front center of the platform. The lock pin holes are on a equidistant radius about the center pivot bolt hole. The radius of the lock pin holes about the pivot bolt hole is less than the radius of the trailer ball mounting holes whose distance from the pivot bolt hole is equidistance with respect to each other. The radius of the trailer ball mounting holes about the pivot bolt hole is in turn less than the radius about the pivot bolt hole or distance from the pivot bolt hole of the standard hitch pin hole. The rotating platform is held in the U bracket by a pivot bolt and is then further pinned in position with a standard pin and clip.

For a better understanding of the present invention, reference should be made to the drawings in which there is illustrated and described preferred embodiments of the present invention.

DESCRIPTION OF THE DRAWINGS

FIG. 5 is a cut-away perspective view of the present invention showing an alternate attachment method to the towing vehicle. This figure illustrates the fact that the Rotating Multiple Ball Trailer Hitch may be attached directly to the bumper of said vehicle allowing for its use on vehicles that do not have a receiver type hitch mount.

DESCRIPTION OF THE PREFERRED EMBODIMENT

Figure 1:
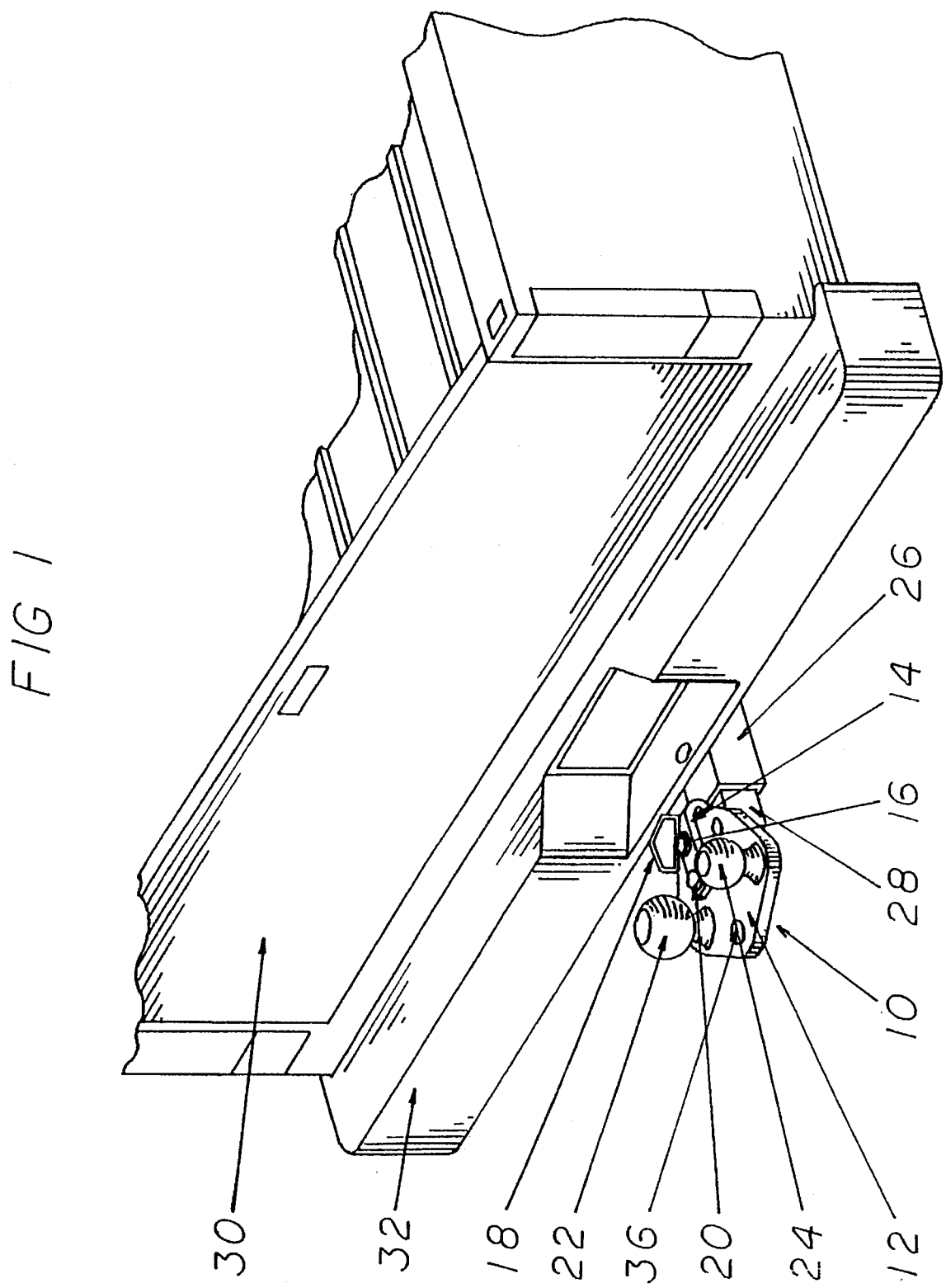
FIG. 1 is a cut-away perspective view of the Rotating Multiple Ball Trailer Hitch showing the orientation of its major components when attached to a vehicle by the use of a receiver type hitch mount.

Referring to the drawings in detail, wherein like numerals designate like parts throughout the several views, as shown by FIG. 1, the Rotating Multiple Ball Trailer Hitch 10 attaches to the towing vehicle 30 in one method by means of the use of a receiver type hitch mount 26. This receiver type hitch mount 26 is located under the rear bumper 32 and is attached to the frame of said towing vehicle 30.

The Rotating Multiple Ball Trailer Hitch 10 is attached to the receiver type hitch mount 26 by the receiver insert 28 which in turn provides the attachment point for the U bracket 14 this bracket is typically attached to the receiver insert 28 by a weld. The rotating trailer ball platform 12 fits inside the inner surface of the U bracket 14 and is held in place at its center by the off center pivot bolt 20, this configuration allows the rotating trailer ball platform 12 to rotate to the desired use position. The rotating trailer ball platform 12 may then be locked into the desired position by the use of the locking pin 16. The locking pin 16 may be engaged or disengaged by use of the locking pin handle 18 which is located at the upper end of the locking pin 16.

The large trailer ball 22 and the small trailer ball 24 are bolted to a front portion of the rotating trailer ball platform 12 and may be moved and locked into the desired position for towing purposes. The alternate ball/standard hitch pin hole 36, also located on a front portion of the platform, may be used as a position for the mounting of an additional trailer ball or as an attachment hole for standard pin type hitches.

Figure 2:
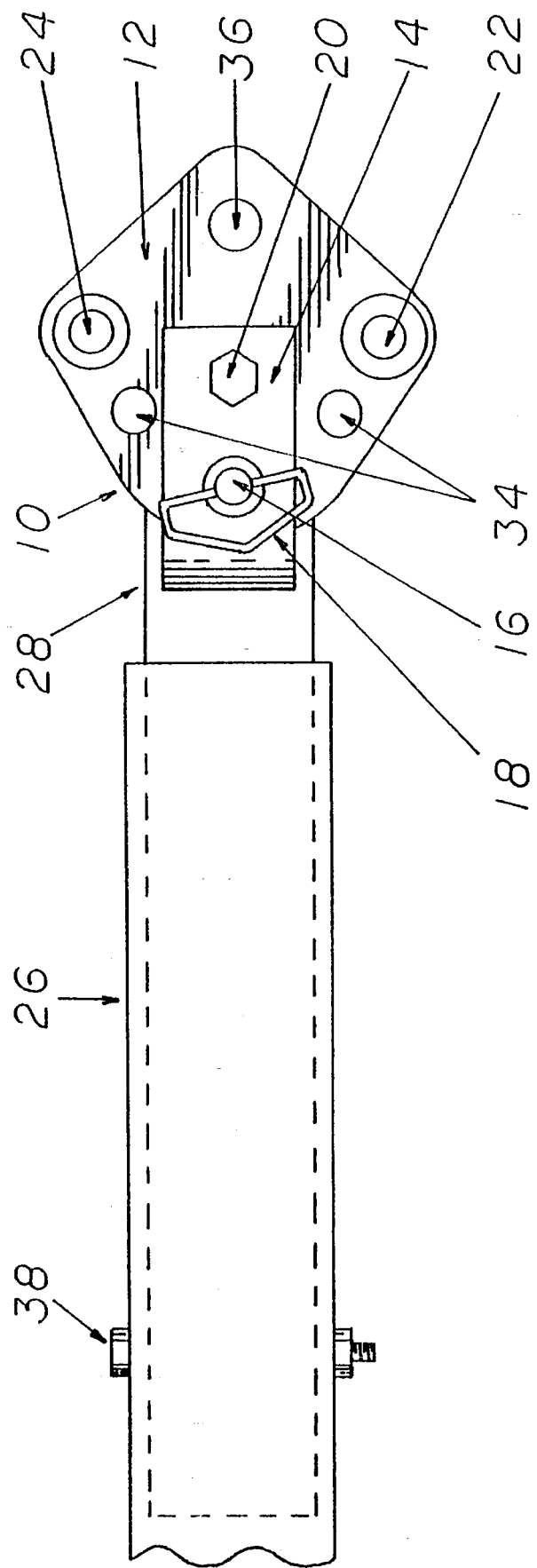
FIG. 2 is a top elevation view of the present invention showing it as attached to a receiver type hitch mount, it further shows the components and attached trailer balls of said invention and their orientation when the rotating ball platform is in the standard, straight position.

As shown by FIG. 2, the Rotating Multiple Trailer Ball Hitch 10 is attached to the receiver type hitch mount 26 by sliding the receiver insert 28 into the receiver type hitch mount 26. The Rotating Multiple Trailer Ball Hitch 10 is then held in this position by the use of the hitch to receiver attachment bolt 38 which secures the receiver insert 28 within the receiver type hitch mount 26.

This figure also shows how the rotating trailer ball platform 12 fits within the U bracket 14 and the location of the center pivot bolt 20 and the locking pin 16 and locking pin handle 18 in relation to the U bracket 14 and the rotating trailer ball platform 12. The figure further depicts the orientation of the large trailer ball 22, the small trailer ball 24, the alternate ball/standard hitch pin hole 36, and the alternative position locking pin holes 34, located on a rear portion of the platform, when the rotating trailer ball platform 12 is locked into the straight, or normal position.

Figure 3:
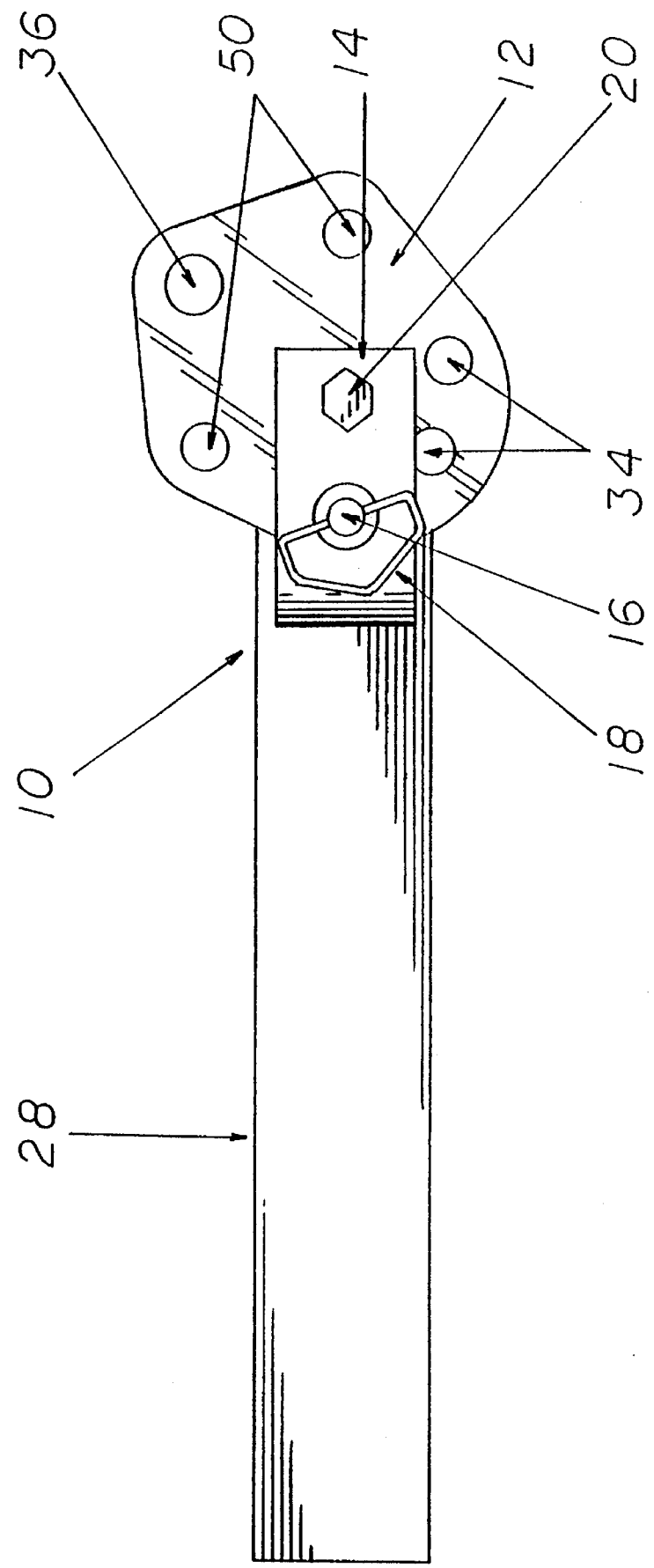
FIG. 3 is a top elevation view of the Rotating Multiple Ball Trailer Hitch showing it as disconnected from the receiver type hitch mount and without any trailer balls connected to it. This figure also shows the orientation of the present invention's major components when the rotating ball platform is in its alternate, turned position.

By contrast, FIG. 3 shows the Rotating Multiple Ball Trailer Hitch 10 in a position where the rotating trailer ball platform 12 mounted in U bracket 14 has been rotated around the center pivot bolt 20 and locked into position by engaging the locking pin 16, by use of the locking pin handle 18, in one of the alternate position locking pin holes 34 located in the rotating trailer ball platform 12. This provides for the direct alignment of one of the trailer ball mount holes 50 with the center pivot bolt 20 and the locking pin 16 which provides the connection point for the rotating trailer ball platform 12.

This direct alignment transfers the lateral forces of pulling a trailer in a straight line to the receiver insert 28, thereby increasing the structural integrity of the Rotating Multiple Ball Trailer Hitch 10.

FIGS. 2 and 3 further illustrate how the placement of the alternate position lock pin holes 34 on a rear portion and the trailer ball mounting holes 50 as well as the alternate ball/standard hitch pin hole 36 on a front portion allow for the minimization of surface area on the rotating ball platform 12. This is accomplished by placing the center pivot bolt 20 in an off centered position on rotating ball platform 12. The trailer ball mounting holes are than placed on a radius about the center pivot bolt 20 which is less than the radius on which the trailer ball mounting holes 50 are placed about the center pivot bolt 20. In turn alternate ball/standard hitch pin hole is placed on a radius from the center pivot bolt 20 even greater than that of the trailer ball mounting holes 50. This configuration allows the distance between the trailer ball holes 50 to be maximized while keeping the size of the rotating ball platform to a minimum and yet allow for large towing applications with minimal turning distance required to change positions.

Figure 4:
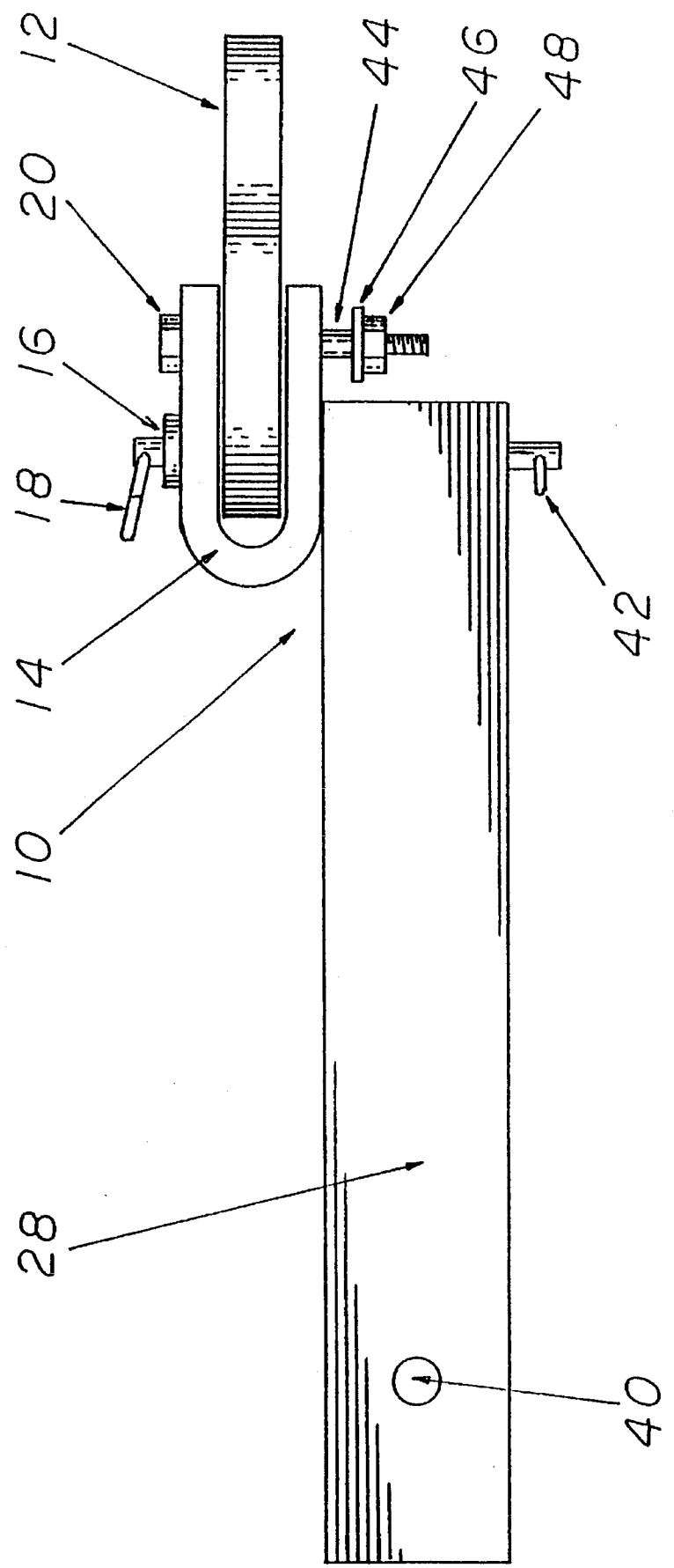
FIG. 4 is a side elevation view of the present invention showing the manner in which the rotating ball platform is solidly attached to body of the Rotating Multiple Ball Trailer Hitch while allowing it to rotate around the off center pivot bolt.

FIG. 4 shows how the center pivot bolt 20 passes through the upper surface of the U bracket 14, then through the rotating trailer ball platform 12, and then passing out the lower surface of the U bracket 14. The important feature of this configuration is that the center pivot bolt 20 is designed in a manner that provides a non-threaded shoulder 44 which prevents the retaining washer 46 and the retaining nut 48 from being fastened tight enough, against the lower surface of the U bracket 14, to crimp the U bracket 14. This prevents the two surfaces of the U bracket 14 from closing on the rotating trailer ball platform 12 and thereby limiting the rotational feature of said platform.

FIG. 4 further shows the location of the locking pin 16 and the locking pin handle 18 behind the center pivot bolt 20. The locking pin 16 passes through the U bracket 14, the rotating trailer ball platform 12, and extends out the bottom surface of the receiver insert 28. The locking pin 16 is restrained from moving on a vertical plain when in the engaged position by the use on the locking pin lower retaining clip 42 located on the lower end of the locking pin 16.

Also shown is the location of the hitch to receiver attachment bolt hole 40 at the most rearward end of the receiver insert 28. This provides for the attachment point for the Rotating Multiple Ball Trailer Hitch 10.

FIG. 5 shows an alternative method of attaching the Rotating Multiple Ball Trailer Hitch 10 to the rear of the towing vehicle 30. In this configuration the U bracket 14 is attached directly to the rear bumper 32 of the towing vehicle 30 and the locking pin 16 may be engaged by passing it through the lower surface of the rear bumper 32 by the use of the locking pin handle 18. The center pivot bolt 20 also passes through the lower surface of the rear bumper 32. This configuration still allows the rotating trailer ball platform 12 to rotate around the off center pivot bolt 20, thereby allowing the use of the large trailer ball 22, the small trailer ball 24, and the alternate ball/standard hitch pin hole 36 in the same manner as previously described.

Although the present invention has been described in considerable detail with reference to certain preferred versions thereof, other versions are possible. Therefore, the spirit and scope of the appended claims should not be limited to the description of the preferred versions contained herein.

We claim:

1. A Rotating Multiple Ball Trailer Hitch for mounting to motor vehicles equipped with receiver type hitches comprising:

a receiver type insert tube having a horizontal mounting hole for connecting the insert tube to a receiver type hitch;

a U bracket fixably attached in a horizontal position to said insert tube, said U bracket having two arms connected by a curved portion, said U bracket further having a first lock pin hole running vertically through both arms and through said insert tube, said U bracket further having a second hole running vertically through both arms opposite of the curved portion;

a rotating ball platform having an off center pivot bolt hole, a portion of said platform rearward the off center pivot bolt hole forming a rear portion having a plurality of lock pin holes, each of said lock pin holes being equidistant from said pivot bolt hole, a portion of said platform forward the off center pivot bolt hole forming a front portion, said front portion being relatively larger than said rear portion and having a plurality of trailer ball mounting holes, each trailer ball mounting hole being located further from said pivot bolt hole than said lock pin holes;

a pivot bolt, said bolt extending through said second hole running vertically through both U bracket arms and vertically through said off center pivot bolt hole so as to rotatably attach said platform between said U bracket arms; and a removable lock pin running vertically through said lock pin holes on said U bracket and through one of the lock pin holes on the rear portion of said platform and further through said receiver type insert tube.

2. A Rotating Multiple Ball Trailer Hitch as in claim 1 wherein said platform is substantially shaped as a pentagon said pentagon having four flat sides and one curved side said curved side being on the rear portion of said platform.

3. A Rotating Multiple Ball Trailer Hitch as in claim 2 wherein said pivot bolt is a shoulder bolt.

4. A Rotating Multiple Ball Hitch as in claim 3 wherein said platform is further supplied with one or more bolt on ball type hitch attachments said ball attachments being connected to said platform through said trailer ball mounting holes.

5. A Rotating Multiple Ball Trailer Hitch as in claim 4 wherein said U bracket is attached to said receiver type insert tube by a weld.

6. A Rotating Multiple Ball Trailer Hitch for mounting to motor vehicles comprising:

a motor vehicle having a rear bumper:
  a U bracket fixably attached in a horizontal position to said rear bumper, said U bracket having two arms connected with a curved portion, said U bracket further having a first lock pin hole running vertically through both arms and through said bumper, said U bracket further having a second hole running vertically through both arms opposite of the curved portion;

a rotating ball platform having an off center pivot bolt hole, a portion of said platform rearward the off center pivot bolt hole forming a rear portion having a plurality of lock pin holes, each of said lock pin holes being equidistant from said pivot bolt hole, a portion of said platform forward the off center pivot bolt hole forming a front portion, said front portion being relatively larger than said rear portion and having a plurality of trailer ball mounting holes, each trailer ball mounting hole being located further from said pivot bolt hole than said lock pin holes;

a pivot bolt, said bolt extending through said second hole running vertically through both U bracket arms and vertically through said off center pivot bolt hole so as to rotatably attach said platform between said U bracket arms; and a removable lock pin running vertically through said lock pin hole on said U bracket and through one of the lock pin holes on the rear portion of said platform and finally through said bumper.

7. A Rotating Multiple Ball Trailer Hitch as in claim 6 wherein said platform is substantially shaped as a pentagon said pentagon having four flat sides and one curved side said curved side being on the rear portion of said platform.

8. A Rotating Multiple Ball Trailer Hitch as in claim 7 wherein said pivot bolt is a shoulder bolt.

9. A Rotating Multiple Ball Trailer Hitch as in claim 8 wherein said platform is further supplied with one or more bolt on ball type hitch attachments said ball attachments being connected to said platform through said trailer ball mounting holes.

* * * * *